United States Patent [19]
Zeigler

[11] Patent Number: 4,987,202
[45] Date of Patent: Jan. 22, 1991

[54] METHODS FOR THE SYNTHESIS OF POLYSILANES

[76] Inventor: John M. Zeigler, #421 2208 Lester Dr., NE., Albuquerque, N. Mex. 87112

[21] Appl. No.: 327,195
[22] PCT Filed: Apr. 14, 1987
[86] PCT No.: PCT/US87/00850
    § 371 Date: Oct. 14, 1988
    § 102(e) Date: Oct. 14, 1988

Related U.S. Application Data

[63] Continuation of Ser. No. 851,713, Apr. 14, 1986, abandoned.

[51] Int. Cl.$^5$ .............................................. C08G 77/00
[52] U.S. Cl. ...................................... 528/10; 556/430; 528/33
[58] Field of Search ...................... 556/430; 528/33, 10

[56] References Cited

U.S. PATENT DOCUMENTS 2,606,879  8/1952  Clark .................................. 556/430
4,588,801  5/1986  Harrah et al. ......................... 528/33

OTHER PUBLICATIONS

Plochocka et al., "Solvent Effect in Radical Copolymerization and Sequence ... ," Polym. Prep., 19, 240 (1978).
Park et al., "Characterization of Styrene-Acrylamide Copolymers by Intrasequence Cyclization Reactions," Polym. Prep. 27 (2)81 ('86).

*Primary Examiner*—Melvyn I. Marquis
*Attorney, Agent, or Firm*—Millen, White & Zelano

[57] ABSTRACT

A method of controlling the yield of polysilane of a desired molecular weight and/or polydispersity prepared in a reductive condensation of corresponding silane monomers on a solid catalyst dispersed in an inert solvent for both the monomers and the growing polymer chains, comprises determining the variation of molecular weight and/or polydispersity of the polysilane as a function of the solubility of the polysilane in reaction solvent, determining thereby a chosen optimum solubility of the polysilane in solvent for obtaining a desired yield of polysilane of said desired molecular weight and/or polydispersity, and thereafter carrying out the preparation of the polysilane in a solvent in which the polysilane has said chosen optimum solubility.

33 Claims, 5 Drawing Sheets

FIG. 1

METHODS FOR THE SYNTHESIS OF POLYSILANES

The U.S. Government has rights in this invention pursuant to Contract No. DE-AC04-76DP00789 awarded by the U.S. Department of Energy.

This application is the national phase of PCT/US87/00850 of Apr. 14, 1987, which is a continuation-in-part of U.S. Ser. No. 851,713 of Apr. 14, 1986 and now abandoned.

BACKGROUND OF THE INVENTION

This invention relates to improved methods and techniques for preparing polysilanes in increased yields, higher molecular weights and/or lower polydispersities, and for controlling the polymerization of silanes to form polysilanes.

Interest in polysilanes, a "new" class of polymers with a backbone of silicon atoms bonded to various organic substituents, (Scheme 1), is growing rapidly as a result of an increasing number of emerging technological applications for the materials. These include uses as: precursors to SiC fibers, S. Yajima, *Am. Ceram. Soc. Bull.*, 62, 893 (1983) and references therein; ceramic reinforcements, K. Mazdyasni, et al., *J. Am. Ceram. Soc.*, 61, 504 (1978); vinyl polymerization catalysts, A. R. Wolff, R. West, and D. C. Peterson, 17th Organosilicon Symposium, Fargo, ND (1983); conductive polymers for batteries, mid-UV solvent-developed photoresists, D. C. Hofer, R. D. Miller and C. G. Willson, *SPIE Adv. Resist Tech.*, 469, 16 (1984); imageable etch barriers in bilayer microlithography, H. Hiraoka, et al., U.S. Pat. No. 4,464,480 (1984); contrast enhancement layers, D. C. Hofer, R. D. Miller, C. G. Willson, A. Neureuther, *SPIE Adv. Resist Tech.*, 469, 108 (1984); self-developing deep UV photoresists and imageable etch barriers, etc., J. M. Zeigler, L. A. Harrah, and A. W. Johnson, *SPIE Adv. Resist Tech.*, 539, 166 (1985). Several of these are covered in U.S. Ser. Nos. 597,005 and 616,148, both now allowed, and both of which disclosures are entirely incorporated by reference herein.

SCHEME 1
WURTZ-TYPE REDUCTIVE CONDENSATION OF DICHLOROSILANES $$R_1R_2SiCl_2 + 2\,Na \xrightarrow[\text{SOLVENT}]{\text{INERT}} (Si)_n + 2\,NaCl$$

$R_1, R_2$ = ALKYL, ARYL, H, VINYL ARALKYL    to $n > 2000$

Despite the technological potential of these materials, well-controlled and reproducible methods for making them in high yield, high molecular weight, and with narrow molecular weight distributions have not been reported. Since these qualities are of major importance for many applications, particularly those in the microelectronics processing area, a need exists for improved synthetic methods and routes to polysilanes.

Polysilanes are prepared by the reductive Wurtz-type coupling of the corresponding dichlorosilanes with an alkali metal, typically sodium (Scheme 1). Copolymers can be synthesized by using a mixture of two (or more) dichlorosilane monomers. This method generally gives a mixture of linear polymer and cyclic low molecular weight oligomers. For most of the aforementioned applications, the cyclics fraction is of little or no value. It is desirable to shift the course of the reaction to production of as much linear polymer as possible at the expense of the cyclics. In methods known to the prior art, this reaction normally produces a molecular weight distribution in the linear polymer fraction which is highly polydisperse ($\overline{M}w/\overline{M}n > 25$) and has at least two (and often more) molecular weight modes. This extremely high polydispersity is particularly detrimental to the proposed application of polysilanes as photoresists or imageable oxygen reactive ion etch barriers, since it can lead to low apparent photospeed, degradation of physical properties, or both. Thus, it would be highly desirable to have an improved route to polysilanes which give higher yields of linear polymer having decreased breadth (polydispersity) of the molecular weight distribution. Polysilanes have been prepared by the reaction in Scheme 1 since the first preparation of the intractable $(Ph_2Si)_n$ by Kipping, *J. Chem. Soc.*, 125, 2291 (1924); ibid., 119, 830 (1921). Burkhard, (U.S. Pat. No. 2,554,976 (1951); C. A. Burkhard), *J. Am. Chem. Soc.*, 71, 963 (1949), teaches the preparation of insoluble, infusible $(Me_2Si)_n$ (where Me=CH$_3$) of MW about 3200 by the above reaction carried out in aromatic or aliphatic hydrocarbons in an autoclave at a temperature above the melting point of the sodium metal reductant. No differentiation is provided regarding order of reactant addition and no specific studies of the effect of varying the reaction solvent are reported. Clark (U.S. Pat. No. 2,606,879 (1952)) describes the preparation of various silane homopolymers as greasy or wax-like mixtures by essentially the same method using Na metal but without the autoclave. No specific molecular weight characterization is provided. A related disclosure is Jap. Kokai Tokyo Koho JP No. 58,185,628. More recently, Yajima, et al., (U.S. Pat. No. 4,052,430 (1977)), disclosed the preparation of low molecular weight branched and/or polycyclic polycarbosilanes (—Si—C—Si— main chain polymers) from $(Me_2Si)_n$ prepared essentially by the method of Burkhard. A similar preparation of $(Me_2Si)_n$ as a precursor to polycarbosilanes is reported by Iwai, et al., (U.S. Pat. No. 4,377,677 (1983)). In neither of these latter cases is information provided regarding the MW distribution of the $(Me_2Si)_n$ prepared, but one must assume that it is similar to that reported by Burkhard since the synthetic method is the same.

In a series of three papers, Wesson and Williams report the synthesis of $(Me_2Si)_n$ from highly purified $Me_2SiCl_2$, J. P. Wesson and T. C. Williams, *J. Polym. Sci., Polym. Chem. Ed.*, 2833 (1979), the synthesis of copolymers of the Me$_2$Si subunit with EtMeSi or n-propyl MeSi subunits, ibid., 959 (1980), and, finally, the preparation of block copolymers of the —(—Ph$_2$Si)$_5$— block with blocks of random length containing Me$_2$Si, EtMeSi, or Et$_2$Si subunits, respectively ibid., 65 (1981)). In the Wesson and Williams preparation of $(Me_2Si)_n$, highly purified Me$_2$SiCl$_2$ is added in a single portion to an octane dispersion of Na metal, whereupon the mixture is then heated above the melting point of the Na (98° C.). At this point, a very vigorous reaction occurs. This method is claimed to give an 80% yield of $(Me_2Si)_n$ where n, on the average, is claimed to be 637. Again, no data on the molecular weight distribution are available due to the insolubility of $(Me_2Si)_n$. This method is essentially comparable to that of Burkhard, (U.S. Pat. No. 2,554,976 (1951)), *J. Am. Chem. Soc.*, 71, 963 (1949). The same procedure was utilized for the copolymers with yields ranging from 20–90% for the total polymer product. Since various fractions of these copolymers were obtained which were soluble to varying extents, it is clear that they are fairly polydisperse although no MW distributions were reported. It was claimed, however, that the higher polymers had $\overline{M}n$ of about 25,000–100,000. The route to block copolymers involves entirely different chemistry as shown in Scheme 2 and is not directly germane to the coupling chemistry illustrated in Scheme 1.

Scheme 2

$$(Ph_2Si)_5 + 2Li \xrightarrow{THF} Li(Ph_2Si)_5Li \xrightarrow{Cl(R_1R_2Si)_nCl} -$$

$$((-R_1R_2Si)_n-(Ph_2Si)_5)_x$$

A German patent teaches chemistry related to that in Scheme 2, Farbenfab. Bayer A. G., DE No. 1,236,506 (1967). In this patent, various $(PhRSi)_n$ polymers, where R=aryl, alkyl, cycloalkyl, are prepared by coupling the corresponding dichlorosilanes with Na metal essentially as in Burkhard and Clark. The resulting polysilanes are then cleaved with K metal to give $K-(-PhRSi)_x-K$ which are the subject of the claims. Thus, the preparation of high molecular weight polysilanes is only incidental to the main subject of the patent.

A method for the preparation of a copolymer containing both PhMeSi and Me$_2$Si units is described in a patent by West, et al., (U.S. Pat. No. 4,324,901 (1982)), and a paper, *J. Am. Chem. Soc.*, 103, 7352 (1981). The copolymer is obtained by cocondensation of the corresponding monomers according to Scheme 1 using toluene as solvent. Approximately a 60% yield of polysilane copolymer having an extremely broad bimodal molecular weight distribution was obtained. Similarly, Trujillo has reported (*J. Organomet. Chem.*, 198, C27 (1980)) that approximately a 60% yield of the (PhMeSi)$_n$ homopolymer can be obtained by adding the monomer to a refluxing dodecane slurry of finely dispersed Na. This method again provides a broad bimodal MW distribution and considerable amounts of insoluble polymer are formed due to crosslinking.

Several papers describe the synthesis of various silane homo and copolymers by the addition of the appropriate monomer(s) to a refluxing slurry of sodium dispersion in toluene. P. Trefonas, et al., *J. Polym. Sci., Polym. Lett. Ed.*, 21, 819 (1983); X. H. Zhang and R. West, *J. Polym. Sci., Polym. Chem. Ed.*, 22, 159 (1984); ibid., 225 (1984). Broad MW distributions and high polydispersities are again obtained as in previous cases where this method is used. Yields range from 20–60% but the polymer obtained is contaminated with large quantities of low MW material.

The use of mixed solvents for the coupling reaction has been examined by two groups. A group at IBM has reported that mixtures of toluene with diglyme provide improved yields of (cyclohexyl MeSi)$_n$ R. D. Miller, et al., in *Materials for Microlithoqraphy*, L. F. Thompson, C. G. Willson; J. M. J. Frechet, Eds., American Chemical Society, Washington, D.C. 1984, pp. 294–296; and McKean et al., *IBM Tech. Discl. Bull.*, 27, (3), 1984. (from 10 up to approx. 30%). This modification has two serious defects: (1) the MW distribution becomes bimodal and each mode is broadened; and (2) the molecular weight modes are both below the critical molecular weight for chain entanglement at about 30,000 daltons. This latter point is important because polymers below this critical value show rheological and structural properties which resemble monomeric compounds rather than high polymers. In a series of several papers, reports, and patent applications, Schilling, et al., have disclosed the use of mixtures of various ethers with alkanes or arenes as reaction solvents for the cocondensation of vinyl dichlorosilanes with various methyl silanes to give partially soluble, vinyl-containing polysilanes for use as precursors to SiC. C. L. Schilling, Jr. and T. C. Williams, *Polym. Prepr.*, 25(1), 1 (1984); C. L. Schilling, Eur. Pat. Appln. No. 123,834; C. L. Schilling, Technical Report 83-4 and 83-4, contracts #N-00014-75-C-1024 and N-00014-81-C-0682 (Office of Naval Research). Although Schilling found that addition of these cosolvents reduces crosslinking during synthesis, the polymer formed was of very low MW (<5000 daltons).

A patent by Peterson, et al. (U.S. Pat. No. 4,276,424 (1981)), discloses an unusual variant of the Na mediated coupling of dichlorosilanes shown in Scheme 1. In this case, the reduction is carried out in tetrahydrofuran using Li metal as reductant and a monochlorosilane, R$_1$R$_2$SiHCl, as the silicon monomer. In this reaction LiCl and H$_2$ gas are produced as byproducts. This method is claimed to be particularly useful for producing cyclic oligomeric silanes rather than high polymer. It is, thus, not applicable to the production of linear high polysilanes.

A Yajima, et al., patent (U.S. Pat. No. 4,159,259) involves various procedures for the preparation of polycarbosilanes and polycarbosilanes containing various metallic species which are useful as precursors to silicon carbide. Several of the examples demonstrate the use of various cyclic or linear polysilanes as precursor materials. In the examples, two different synthesis procedures for (Me$_2$Si)$_n$ are given. In example 8, sodium and Me$_2$SiCl$_2$ are reacted in an unspecified solvent to give (Me$_2$Si)$_n$ as an insoluble solid of unspecified molecular weight. In example 16, sodium is heated in "decalin anhydride" and Me$_2$SiCl$_2$ "added dropwise." This provided (Me$_2$Si)$_n$ again as a precipitate. Although the experimental details are incomplete, both procedures appear to fall within the scope of Burkhard's original patent (U.S. Pat. No. 2,554,976). Neither provides any information regarding the molecular weight distribution of the (Me$_2$Si)$_n$ obtained.

A patent to Nitzsche, et al., (U.S. Pat. No. 3,830,780) discloses a process for condensing linear, hydroxy-terminated polysiloxanes to higher polysiloxanes by heating in the presence of an optional aluminum catalyst. No polysilane structures are mentioned and the chemistry of the condensation process yields Si-O-Si bonds in the polymer backbone.

In Gordon and Clark (U.S. Pat. No. 2,696,480), methods for the preparation of polymers having Si—Si, Si—C$_6$H$_4$—Si—O, and —C$_6$H$_4$—Si—C$_6$H$_4$—Si—O— backbone structures are disclosed. Although the polymers prepared in this patent contain Si—Si linkages like polysilanes, these constitute a relatively small fraction of the backbone bonds. Thus, this patent does not involve polysilane synthesis per se. No guidance is provided regarding optimum procedures for producing Si-Si backbone polymers with high molecular weights and low polydispersities.

Baney, et al., (U.S. Pat. No. Re. 31,447) describe the preparation and use of alkoxylated or phenoxylated polysilanes and precursors to silicon carbide. The polysilanes in this patent are actually oligosilanes (Mn=632, vide col. 7, lines 51-53) formed by the equilibration of direct process residue (a mixture of various di, tri, and tetrachlorodisilanes) with various phosphonium chlorides. Reaction of the equilibrated chloroterminated oligosilanes in situ with alcohols provides the subject silicon carbide precursor materials. The Baney, et al. processes provide only low molecular weight products by an equilibration process of disilanes rather than by Na-mediated condensation of dichlorosilanes. A publication of the data in this patent (Baney, et al., *Organometallics*, 2, 859 (1983)) suggests that the products of the Baney, et al. process are polycyclic polysilanes rather than high molecular weight linear polysilanes.

A patent to Schilling, Jr., et al. (U.S. Pat. No. 4,472,591) describes methods for the preparation of hydrosilyl modified polycarbosilanes. Even though some Si-Si backbone bonds are formed when the various silanes are condensed with alkali metals by the procedures described in this patent, the branched polycarbosilanes obtained are only distantly related to linear high molecular weight polysilanes.

Clark (U.S. Pat. No. 2,563,005) and West (U.S. Pat. No. 4,260,780) deal with the synthesis of various polysilanes from dichlorosilanes by condensation with alkali metals in various hydrocarbon and non-hydrocarbon solvents. The only molecular weight data in either patent is for a $(PhMeSi)_n$ polymer prepared by condensation with Na metal in toluene. A molecular weight of 30,000 is claimed for this particular material but no information regarding the nature of the distribution is given. The procedures utilized in this patent upon reproduction provide materials which are of low molecular weight ($\overline{M}w < 30,000$) and high polydispersity $M_w/M_n > 20$).

SUMMARY OF THE INVENTION

It is accordingly an object of this invention to provide an improved method for preparation of polymers preparable by heterogeneous reactions, most especially for the preparation of polysilanes. It is another object to provide such a method which enables improved control over the nature of the polymer produced, e.g., which enables production of polymers such as polysilanes in higher molecular weights and/or lower polydispersities at increased yields, and in reproducible manner.

Upon further study of the specification and appended claims, further objects and advantages of this invention will become apparent to those skilled in the art.

These objects have been achieved by providing a method of controlling the yield of polysilane of a desired molecular weight and/or polydispersity prepared in a reductive condensation of corresponding silane monomers on a solid surface-reacting agent dispersed in an inert solvent for both the monomers and the growing polymer chains, comprising determining the variation of molecular weight and/or polydispersity and/or yield of the polysilane as a function of the compatibility of the polysilane with reaction solvent, determining thereby a chosen optimum degree of compatibility of the polysilane in solvent for obtaining a desired yield of polysilane of said desired molecular weight and/or polydispersity, and thereafter carrying out the preparation of the polysilane in a solvent in which the polysilane has said chosen optimum degree of compatibility.

The nature of the solvent characteristics which will be chosen to effect the desired improvement in polymer properties will be different for systems wherein the monomer is added to a dispersion of the solid agent (normal addition) versus systems wherein the solid agent is added to a solution of the monomer (inverse addition), as will be discussed further in detail below. The method is fully applicable to homopolymers and copolymers. In a special aspect, the solvent will be a compound solvent comprising at least two individual solvents. This invention provides a unique method for determining the ratio of components in such a solvent mixture which enables achievement of the desired control over polysilane properties.

In another aspect, these objects have been achieved by providing a method of decreasing the polydispersity of a polysilane prepared by reductively condensing corresponding silane monomers on a solid surface-reacting agent dispersed in an inert solvent, comprising adding the monomers to a dispersion of the solid agent at a substantially constant rate or adding the solid agent to a solution of the monomers at a substantially constant rate. This aspect of the invention is applicable to any order of addition of the reaction components.

In yet further aspects, these objects have been achieved by providing a method of preparing a polysilane comprising polymerizing the corresponding monomers by adding an effective solid surface-reacting agent to a solution of the monomers in a compound solvent which is a mixture of at least two component solvents, the relative amounts of which are chosen to minimize the compatibility of the growing polymers therein without causing the polymer to precipitate; or a method of preparing a polysilane comprising polymerizing the corresponding monomers by adding them to a dispersion of a surface-reacting agent in a compound solvent which is a mixture of at least two component solvents, the relative amounts of which are chosen to maximize the compatibility of the growing polymer therein.

These objects have also been achieved by providing a method of determining an optimum solvent for preparing a polysilane in increased yields of desired molecular weight and/or polydispersity, in a heterogeneous reductive condensation of corresponding silanes in a solvent, comprising:

determining the optimum differential between the solubility parameters of the polysilane and that of the solvent which will optimize yield of polysilane of said desired molecular weight and/or polydispersity when the polymerization is conducted in said solvent, and choosing a solvent whose solubility parameter differs from that of the polysilane by said differential. In a preferred aspect of this method wherein the solvent is a mixture of at least two individual solvents, the method involves calculating the solubility parameter of the polysilane, adding to said solubility parameter said optimum solubility parameter differential to obtain a desired solvent solubility parameter, and determining the relative amounts of said two individual solvents in said mixture by calculating the corresponding composition whose solubility parameter matches said desired solvent solubility parameter.

In yet further aspects, these objects have more generally been achieved by providing a method of controlling the yield of a polymer of a desired molecular weight and/or polydispersity prepared in a heterogeneous reaction wherein solid effective surface-reacting agent is added to a solution of the corresponding monomers, comprising adjusting reaction conditions to minimize access of the monomers to the polymer chains growing at the surface of the solid agent when it is desired to increase molecular weight and/or decrease polydispersity, or to maximize access of the monomers to the polymer chains growing at the surface of the solid agent when it is desired to decrease molecular weight and/or increase polydispersity; or a method of controlling the molecular weight and/or polydispersity of a polymer prepared by adding monomers to a dispersion of solid effective agent, comprising adjusting reaction conditions to maximize access of the monomers to the polymer chains growing at the surface of the agent when it is desired to increase molecular weight and/or decrease polydispersity, or to minimize access of the monomers to the polymer chains growing at the surface of the agent when it is desired to decrease molecular weight and/or increase polydispersity.

In another aspect, these objects have been achieved by providing a method of controlling the molecular weight and/or polydispersity of a polysilane prepared in a reductive condensation of corresponding silane monomers on a solid surface-reacting agent dispersed in an inert solvent, comprising carrying out the reaction with an effective amount of a surfactant having a polar end which can bond to said solid agent.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DISCUSSION

With respect to polysilanes, this invention provides the ability of achieving simultaneously, high molecular weights, e.g., for many polysilanes, greater than 30,000 daltons in greater than 90% of the distribution; low polydispersities ($\overline{M}_w/\overline{M}_n < 2$ in many cases), wherein for polymers which usually give bimodal distributions, this criterion is applied separately to each mode; increased yields of polymers having such characteristics; and high reproducibility under well-defined conditions.

Throughout the following, N refers to normal addition mode, i.e., the addition of monomers to the sodium dispersion reductant dispersed in the reaction solvent; I refers to the inverse addition mode wherein the sodium dispersion is added to the monomers dissolved in the solvent of interest.

Without wishing to be bound by theory, this invention can be discussed in terms of the following mechanism. It is theorized that a major factor in controlling the nature of the polysilane which results from reductive condensation of silanes, typically dichlorosilanes, is the compatibility of the growing polymer chain with the reaction solvent. It is theorized that this compatibility affects the yield and molecular weight of the polymer by controlling the conformation of the growing chains and their degree of coverage of the active surfaces whereby diffusion of the monomer to the surface is controlled.

Polymers are considered to be compatible with each other or a solvent if the Gibbs free energy of mixing, $\Delta G$, is negative (i.e., mixing is spontaneous). Since, by definition, $\Delta G = \Delta H - T\Delta S$ and $\Delta S$ is always positive for polymer dissolution, $\Delta H$ dominates compatibility with a solvent. As the compatibility is decreased, the corresponding change in $\Delta G$ can be brought about by changing $\Delta H$, $\Delta S$, or more usually, both. Thus, a less negative $\Delta G$ implies a higher $\Delta H$ and/or smaller $\Delta S$ (i.e., a more compact polymer conformation, since the change in entropy of the polymer dominates change in entropy of the polymer/solvent ensemble).

In accordance with this theory, for reactions where the solid-reacting surface is the limiting reagent (inverse addition), there will be an optimum solubility parameter difference between the polymer and the reaction solvent at which the monomer concentration at the solid surface is minimized when it is desired to increase polymer molecular weight, but which is not so large as to limit molecular weight by polymer precipitation. Where monomer is the limiting reagent (normal addition mode) the situation is different. Here, large numbers of chains are initiated in the early stage of the reaction. Rather than needing to minimize monomer concentration at the solid surface, it instead is important to maximize monomer concentration to encourage chain growth. The criterion for solvent compatibility with the growing polymer thus is opposite to that for inverse addition. In the normal addition mode, it is desired to have no difference between the solubility parameters of the solvent and the polymer. Under such conditions, the polymer chains adopt their most extended conformations into the solvent. This maximizes the rate of diffusion of monomer to the sodium surface.

Thus, in accordance with this invention, the optimum solvent for achieving a desired combination of yield, molecular weight and/or polydispersity of a polysilane can be determined by selecting a solvent solubility parameter which optimizes the achievement of the desired polymer characteristics. A preferred method of determining the necessary solubility characteristics for the solvent and for determining a corresponding solvent identity is as follows.

Figure 5:
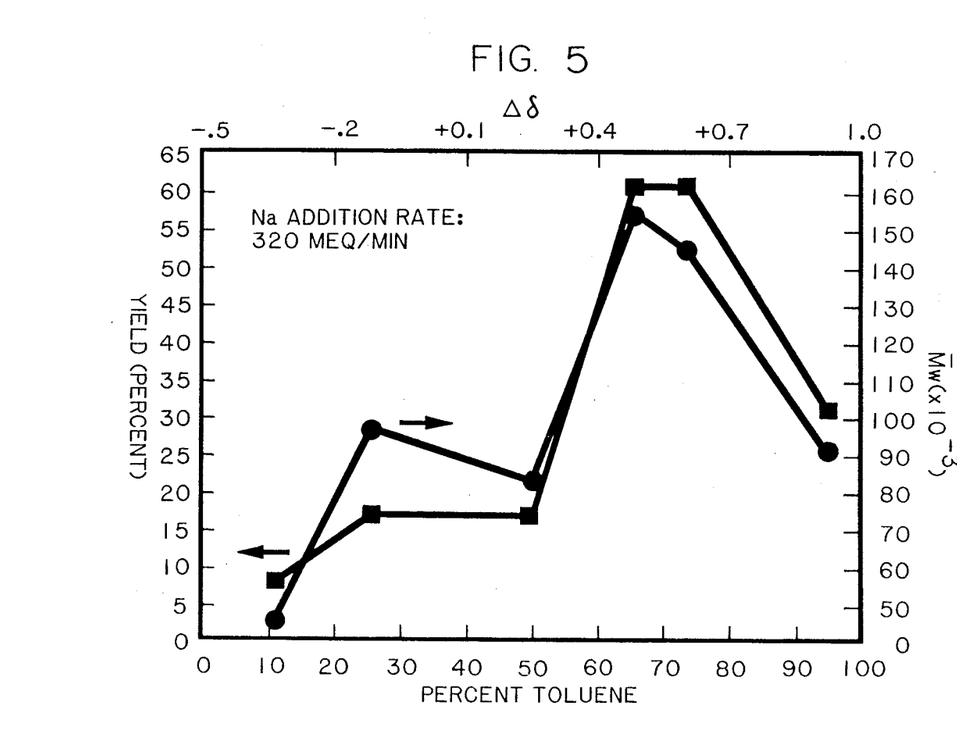
FIG. 5 shows the effect on polysilane properties of solubility parameter difference in inverse addition mode.

Firstly, the variation in polymer properties as a function of the solubility characteristics of the solvent is determined, e.g., as shown in FIG. 5 below. A convenient means for experimentally varying the solubility properties of a solvent is to employ a solvent mixture and to vary the relative amounts of the components. As can be seen from FIG. 5, there is an optimum solvent at which high molecular weight and high yield can be achieved in the particular system employed in the reported experiment. The solubility parameter ($\delta$) corresponding to this solvent can be routinely calculated using well-known procedures. Similarly, the solubility parameter can be calculated for the particular polysilane being produced. For example, see the well-known procedures described in Textbook of Polymer Science, Billmeyer, page 151-154 (1984), and Polymer Handbook, 2nd Edition, H. Burrell, IV-337-359 (1975), which disclosures are entirely incorporated by reference herein. From these values, the solubility parameter difference between that of the polymer and that of the solvent which corresponds to the desired optimum polymer properties can be selected.

As can be seen from FIG. 5, for the achievement of high molecular weight and high yield, the optimum solubility parameter difference using the systems of the above references is in the range of about 0.4 to about 0.9, preferably, 0.5 to 0.8, and most preferably 0.6 to 0.7. (If other models are used, a corresponding differential, of course, can be calculated.) This reflects the mentioned balance between low compatibility and the need to avoid precipitation. Given this value, the optimum polymerization solvent for any dichlorosilane/homosilane or mixture of dichlorosilanes/copolysilanes can be readily calculated by a simple procedure.

Firstly, the solubility parameter is calculated for the polymer or copolymer involved, e.g., using the tabulated data in the references mentioned above enabling use of routine procedures to calculate the parameter from known group molar attraction constants. The preselected optimum solubility parameter difference for the combination of properties desired is then added to the polymer solubility parameter. Where high yield of high molecular weight polymer is desired, a value of 0.6 to 0.7 or other selected differential would be added to the calculated polymer solubility parameter. Next, solvents of interest are chosen in accordance with the usual considerations for choosing solvents for the preparation of polysilanes. Unless there fortuitously is a particular single solvent which has a solubility parameter equal to the value obtained by adding the optimum solubility parameter difference to the solubility parameter of the polymer, a mixture of solvents will be chosen. Again using standard data and calculation methods the relative amounts of the components of the mixture can be selected to provide an overall solvent solubility parameter equal to that calculated above. Where a dispersing agent used for the solid agent (e.g., sodium) is present, its contribution to the calculated solubility parameter should be taken into account. This can have a significant effect on the calculated values where the amount of dispersant (e.g., mineral oil or mineral spirits) is, e.g., about 2% or more in typical situations. This will be particularly important for N addition modes, since the dispersant is present in its full amount from the beginning of the reaction. In a preferred mode of this invention, these steps are carried out with a computer using a corresponding program straightforwardly carrying out the necessary calculations.

For normal mode additions, the procedure is even simpler. Here, it is only necessary to calculate the solubility parameter of the polymer and then to match that of the chosen solvent to it using the procedures mentioned above.

Of course, for both modes of addition, where it is desired to prepare a large amount of a given polysilane, e.g., on a commercial scale, the entire procedure described above can be repeated with respect to that given polymer. Thus, a graph corresponding to that shown in FIG. 5 can initially be constructed in order to determine more closely the optimum solubility parameter difference for that polymer and a chosen solvent system. From this information, the foregoing methods can thus be followed.

Of course, since this invention involves the discovery of the result effective nature of the solubility parameter difference between the polymer and the reaction solvent, purely empirical studies can also be utilized consistent with the guidelines of this disclosure to fully optimize the preparation of any particular polysilane in any particular solvent system. Employment of such purely empirical methods is fully within the scope of this invention.

Utilizing this invention, significantly higher yields (both overall and with respect to the polymers of the desired MW and/or polydispersity, especially those of increased MW and/or decreased polydispersity) can be achieved in comparison with those obtainable in accordance with the prior art. Some of these yields are demonstrated below. Yields 3-5 fold and higher over comparable prior art procedures can readily be obtained. Where high molecular weight product is desired, this can be effected while reducing undesirable crosslinking and chain branching reactions and without concomitant decrease in overall yield. In addition, by optimizing reaction conditions in accordance with this invention, many highly hindered polysilanes previously not preparable in good amounts can now be prepared in improved yields and at high molecular weight where desired. Furthermore, the breadth of the molecular weight distributions which are obtained (polydispersities) can be simultaneously significantly reduced in accordance with this invention, e.g., by factors of 2-20 and higher.

The solvents/cosolvents utilizable in conjunction with this invention include all solvents which are employable in conjunction with polysilane polymerizations. In general, the solvents must solubilize both the polymer and the corresponding monomer and must not solubilize the solid agent, e.g., sodium. Of course, the solvent must also not participate in chain transfer reactions and must be inert to sodium or other agent. Typical non-limiting examples of suitable solvents include hydrocarbons such as arenes, e.g., toluene, xylene, tetralin, benzene, etc., and alkanes, e.g., hexane, heptane, octane, nonane, decane, up to about tetradecane. Both straight chain and branched alkanes are employable. Other compatible solvents include ethers such as glyme, diglyme, triglyme, tetrahydrofuran, etc., and others having no active hydrogen atoms. Choice of the identity per se of the solvent is not critical provided the solvent is inert and does not participate in chain transfer reactions as mentioned; it is the overall solubility parameter of the resultant solvent which is most important in accordance with this invention as explained above. Of course, it is possible and fully within the scope of this invention, that for a given system, solvents with the same solubility parameters might provide improvements of varying degrees, e.g., due to system-specific factors.

While sodium is the preferred reductant for this invention, other effective solid agents can also be used, e.g., lithium and potassium or others suitable for other heterogeneous reactions. Thus, both stoichiometric agents such as the solid reductants mentioned above and more classical catalytic agents are included. In heterogeneous reactions, the active surface is normally provided by solid particles; however, the principles of this invention will be generically applicable to any similar two phase system. The amount of sodium is typically in slight excess, e.g., up to about a 20% excess. The sodium or other reductant can be employed as available commercially, e.g., as a dispersion in light oil, mineral spirits or paraffin (commonly 40% for Na). The latter can be directly suspended in the reaction solvent. For normal addition mode experiments, the dispersion can be conveniently generated in the reaction vessel from chunk sodium.

The concentration of monomers employed is typically limited by the final viscosity which results. In the normal addition mode, it is generally preferred to have a monomer concentration which is as high as possible. Typically, values of 30-60 weight percent of monomer are used. In the inverse addition mode, typically, amounts of monomer of 20-35% are utilized. In the normal addition mode, the monomers can be added to the suspension of sodium neat or preferably as a solution in the chosen solvent. Typically, the monomer solution is added to a sodium dispersion containing a minimum amount of solvent, the final reaction medium containing the mentioned 30-60% of monomer.

The term "monomer" has a broad meaning herein. For example, it includes not only Cl—Si(RR')—Cl compounds but also corresponding dimers, trimers, and other oligomers and prepolymers which may be used as starting materials or formed in situ. All corresponding bifunctional species which can be polymerized to form the desired end polymer such as a polysilane are included.

The reaction is generally conducted at a temperature from above the melting point of sodium up to the boiling point of the solvent, e.g., from about 90° C. to about 250° C. Pressure is not critical but may be increased where the chosen solvent boils at a relatively low temperature, e.g., lower than the melting point of sodium. The time of reaction is also not critical. In many instances, after addition of monomer/catalyst is complete, the reaction will be completed in a few minutes, e.g., often 5-15 minutes. However, it is preferred to continue the reaction at reflux for 0.5 to 2 hours.

It is very important to maintain a purity which is as high as possible during the reaction, not only to obtain as pure a product as possible but also because the reaction is sensitive to impurities. Since the latter tend to contaminate the sodium surface, their effects are magnified. As a result, it is preferred that the reaction be conducted under an inert atmosphere, e.g., nitrogen, argon, etc., and that all reagents be anhydrous and of the highest purity. Typically, the reaction is stirred with standard mechanical means sufficient to ensure sufficient mixing of the reactants to provide good contact between the catalyst and the reacting species. Overly vigorous stirring is to be avoided, e.g., the use of ultrasound is deleterious.

Depending upon the end use of the polysilane, it may be desirable to fractionate the finally produced polymer mixture. Such fractionation can be fully conventionally achieved, e.g., using chromatographic, precipitation or other techniques.

Typically, the overall yields of polysilanes produced in accordance with the improved process of this invention are improved by factors of 3-5. Typically, yields are 30-70% or higher, depending on the mode of addition and particular polymer involved. Lower or higher yields are within the scope of this invention also. For example, this invention has particularly advantageous applicability to the preparation of highly hindered polysilanes which are difficult to prepare due to the effects of steric hindrance but which are highly photosensitive and thus very useful as photoresists. For such polymers even seemingly low yields which might be enabled by this invention would represent a major advance over the prior art. By employing the solvent optimization procedures of this invention, the yield of a desired fraction of molecular weight and/or polydispersity can be significantly increased over those heretofore achievable. This is especially true in situations where high molecular weight polysilanes are desired since high yields and high molecular weights typically are simultaneously achieved, along with lowered polydispersity. Conversions are essentially 100% in all cases.

A very broad range of polysilanes can be prepared using the improved process of this invention. Typical polysilanes are those described in U.S. application Ser. Nos. 597,005, and 616,148 incorporated by reference above. However, many other polysilanes can also be prepared by the process of this invention including those wherein the side chains are a wide variety of hydrocarbon and heterocyclic groups, e.g., alkyl, cycloalkyl, aryl, etc., or combinations thereof, any portion of which can be substituted by a wide variety of reaction compatible or blocked substituents, e.g., including alkyl, alkoxy, hydroxy, acyl, etc. The side chains can be acyclic, cyclic or a combination thereof.

In another feature of this invention, it has been discovered that by maintaining a high constancy of the addition rate of the monomer or the solid surface-reacting agent, significantly lower polydispersities can be achieved in polymerizations of silanes. Typically, the rate of addition should be kept within ±10% of the nominal value, preferably ±5%, most preferably ±1%. Such constancies can be conventionally achieved using syringe pumps or, on larger scales, commercially available peristaltic pumps. Typically, the rate of addition will be in the range of 80-640 milli-equivalents per minute, the exact rate not being critical. In general, it is desired to add the reagent as rapidly as possible while maintaining constancy of rate.

All of the reactions of this invention can be carried out batchwise or continuously.

In another aspect of this invention, it has been discovered that addition of an effective amount of a surfactant to the reaction medium can also be used as a means of controlling the properties of the resultant polymer. Suitable surfactants include all those which have a polar end which is bondable to the reactive surface. For reductants such as sodium, anionic surfactants are most suitable; however, as long as a surfactant species bonds to the surface and provides a non-polar portion extending out from the surface, it is employable in this aspect of the invention. For example, in addition to anionic surfactants such as stearic acid, it is also possible to use hydroxy terminated polysilanes, preferably of the same structure as the polysilane being produced. Such polysilanes are included within the term "surfactant" within the context of this invention.

The precise amount of surfactant added can routinely be determined in accordance with this disclosure and perhaps in conjunction with a few routine preliminary experiments. Very small amounts typically will be effective, e.g., amounts in the range of 0.1-500 mg/l of reaction solvent, preferably 10-100 mg/l of reaction solvent. If the amount added is too high, yields may be reduced presumably because of the sensitivity of the polymerization reaction to trace polar impurities of any nature.

The surfactant provides a microenvironment around active solid particles wherein non-polar chains extend out from the surface. As a result, it can be seen from the foregoing, for normal mode reactions, addition of surfactant tends to increase molecular weight. In inverse mode additions, wherein such a microstructure is adverse to the production of high molecular weight polymers, the molecular weight correspondingly decreases.

Thus, by suitably adjusting the amount of surfactant in the reaction medium, the molecular weight of the resultant polymer can be controlled in either mode.

In yet another aspect of this invention, the nature of the polymer which is achieved can also be controlled by varying the particle size of the solid-reacting surface. In normal addition, the yield of high molecular weight polymer will be increased by increasing the particle size, thereby decreasing the ratio of surface area to monomer concentration. For inverse addition, a decrease in particle size will increase molecular weight because it results in increased surface area and, consequently, an increase in the ratio of surface area to monomer. Typically, for practical reasons, the particle size of sodium when employed, will be that which is commercially available, e.g., around 5 micrometers. This is also the particle size range conventionally achieved when a sodium dispersion is prepared by rapidly stirring a melt in a solvent. Larger particle sizes can be employed in normal addition reactions for the reasons given above, as long as the reaction rate does not become unacceptably small due to the concomitant decrease in surface area.

It has further been determined that a sodium amalgam can be used in place of the conventional sodium metal reductant. This has no significant effect on the desirable properties of the polymer; however, the reactions are more easily controlled since they are slowed down. As a result, overall process safety is improved. Production of the amalgam is fully conventional. The relative content of sodium is not critical, e.g., it can be from 5:1 to 1:5, a ratio of about 1:1 being preferred (mole/mole).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

Below, where the monomer used or the derived polymer formed is not specified, it is $PhMeSiCl_2$ or $(PhMeSi)_n$, respectively. For addition rates specified in meq/min (milliequivalents/min), 1 meq is 0.1% of the stoichiometric amount. Thus, 320 meq/min refers to addition of 32% of the stoichiometric amount in 1 minute; $\overline{M_n}$ is the number-average molecular weight; $\overline{M_w}$ is the weight-average molecular weight; "polydispersity" is the ratio $\overline{M_w}/\overline{M_n}$; "modal" molecular weight is the most prevalent single molecular weight within a single peak in the total distribution; and all molecular weights are determined by size exclusion chromatography and are quoted as "polystyrene equivalent" values.

EXAMPLE 1

Preliminary Experiments

In Table 1 are shown results for preparation of $(PhMeSi)_n$ in the manner of the prior art.

TABLE 1

PRIOR ART SOLVENT EFFECT ON (PhMeSi) Preparation

| SOLVENT | TEMPERATURE | ADDN MODE | POLYMER YIELD (%) | MODAL MW ($\times 10^{-3}$) |
|---|---|---|---|---|
| BENZENE | 78 | I | 25 | 120 |
| TOLUENE | 111 | I | 10 | 500 |
| XYLENE | 134 | I | 8.3 | 110,8 |
| BIPHENYL | 130–135 | I | 10 | 4.5, 200 |
| HEPTANE | 98 | N | 41 | 5 |
| DECANE | 174 | N | 70 | 25, 5 |
| DODECANE | 215 | N | 43 | 60 |
| DECALIN | 190 | N | 42 | 11 |
| GLYME | 85 | I | 28 | 9 |
| TRIGLYME | 100–105 | I | 0 | <1 |

As can be seen, these methods allow one to obtain either moderate yields of low molecular weight material or low yields of high molecular weight polymer, but not both simultaneously. The inverse addition mode provides higher molecular weights while the normal addition mode gives higher yields. For alkane solvents, the yield increases with the boiling point of the solvent, but cross-linking becomes a major problem. Thus, although the isolated yield of $(PhMeSi)_n$ in dodecane is 95%, removal of the insoluble, crosslinked product reduces the usable yield of 43%. The polymer molecular weight is strongly depressed in the two ether solvents. This is due to facile chain transfer to solvent as well as a bulk solvent effect as now understood in view o this invention. The lower molecular weight in alkanes is now appreciated as at least partially attributable to low solubility of the growing polymer chains in the solvent.

In Table 2, comparisons of yield and molecular weight obtained for three different homopolysilanes in the normal and inverse addition modes are shown using solvents as available from the prior art.

TABLE 2

NORMAL Vs. INVERSE ADDITION MODES IN POLYSILANE SYNTHESIS

| MONOMER | SOLVENT | ADDN MODE | POLYMER YIELD (%) | MODAL MW $\overline{M_n}$ ($\times 10^{-3}$) | $\overline{M_w}$ ($\times 10^{-3}$) |
|---|---|---|---|---|---|
| $PhMeSiCl_2$ | TOLUENE | I | 10 | 500 | |
|  |  | N | 23 | 42, 15 | |
|  | DODECANE | I | 43 | 60 | |
|  |  | N | 95 | 100, 6 | |
| 4-anisyl $MeSiCl_2$ | TOLUENE | I | 4.7 | 30 | |
|  |  | N | 18.5 | | 2.7, 18.7 |
| n-dodecyl $MeSiCl_2$ | TOLUENE | I | 5.2 | 300 | |
|  |  | N | 1.5 | | 74, 470 |

Chain transfer to monomer in the case of the 4-anisyl $MeSiCl_2$ limits molecular weight and yield. $PhMeSiCl_2$ polymerization is found to be much more sensitive to the mode of addition than n-dodecyl $MeSiCl_2$, at least as indicated by the molecular weight. For this reason $PhMeSiCl_2$ has been used extensively to probe the reaction mechanism and investigate revised reaction conditions.

Tables 3 and 4 show the results for preparation of a variety of polysilane hompolymers and copolymers, respectively.

TABLE 3

| $R_1R_2$ | YIELD (%) | MODAL MW ($\times 10^{-3}$) | $\overline{M}_n$, $\overline{M}_w$ ($\times 10^{-3}$) |
|---|---|---|---|
| n-PROPYL,Me | 4.4 | 1800,43 | |
| n-HEXYL,Me | 2.0 | 80 | |
| n-DODECYL,Me | 1.8 | 400 | |
| i-PROPYL,Me | 6.8 | 1 | |
| CYCLOHEXYL, Me | 3.0 | | 3.7,95.1 |
| β-PHENETHYL, Me | 4.0 | >2000 | |
| Et, Et | 4.0 | | 0.4,7.9 |
| n-PPOPYL, n-PROPYL | 13 | | 0.4,3.0 |
| n-HEXYL, n-HEXYL | 7.0 | | 78.8,1020 |
| PHENYL, Me | 11 | 450 | |
| 4-ANISYL, Me | 4.7 | 30 | |
| 4-NMe$_2$Ph, Me | 13 | 3.3 | |
| 4-(2-DIOXOLANYL)Ph, Me | Trace | <1 | |
| 2-NAPHGTHYL, Me | 23 | 28 | |

In all cases, these reactions were performed in toluene as solvent using the inverse addition mode. The results for polymerization of various alkyl MeSiCl$_2$ in the first group of Table 3 demonstrate the difficulty of preparing polysilanes having physically large groups bonded to silicon (cf. $R_1$=n-propyl with cases where $R_1$=isopropyl or cyclohexyl). The precipitous drop in molecular weight and/or yield of such highly hindered polysilanes can be reduced by copolymerization of the hindered monomer with an unhindered monomer (Table 4)

TABLE 4

| $R_1$, $R_2$ | $R_3$, $R_4$ | YIELD | MODAL $\overline{M}_w$ ($\times 10^{-3}$) | $\overline{M}_n$ ($\times 10^{-3}$) |
|---|---|---|---|---|
| i-PROPYL, Me | — | 6.8 | 1 | |
| i-PROPYL, Me | n-PROPYL, Me | 16 | | 50,500 |
| i-PROPYL, Me | Ph, Me | 12.5 | | 40,200 |
| t-BUTYL, Me | — | 0 | <1 | |
| t-BUTYL, Me | Me, Me | 7.2 | 16,1 | |
| CYCLOHEXYL, Me | — | 3.0 | | 3.7,95.1 |
| CYCLOHEXYL, Me | Me, Me | 12 | | 40,300 |

Since the highly hindered polysilanes are the most sensitive as photoresists, this inability of the procedures known in the prior art to effectively make such materials at high molecular weight is a major disadvantage. It is also noteworthy that, as the substituent on silicon becomes better able to participate in chain transfer by hydrogen abstraction from monomer, the molecular weights also drop precipitously (cf. $R_1$=Ph, $R_2$=Me with $R_1$=4-dimethylamino Ph, $R_2$=Me). This is good evidence per this invention for the involvement of silyl radicals in the polymerization process, not the silyl anions proposed previously by Miller and others.

Although many of the polysilanes shown in the tables thus far are novel, the results of their preparation as described above falls largely within the bounds of the prior art since only prior art techniques were employed. The Wurtz-coupling of dichlorosilanes shown in Scheme 1 is a very exothermic, highly heterogeneous, strongly kinetically controlled reaction (i.e., linear polymer and cyclic oligomer byproducts do not interconvert under the reaction conditions). Table 5 summarizes the results of experiments probing the effects of increased homogeneity.

TABLE 5

EFFECT OF REDUCTANT TYPE ON (PhMeSi)$_n$ SYNTHESIS

| REDUCTANT | SOLVENT | YIELD | MODAL MW ($\times 10^{-3}$) |
|---|---|---|---|
| Na | TOLUENE | 10 | 500 |
| Na/biphenyl | DME | ~0 | <0.8 |
| Na | DME | 28.1 | 9, 0.7 |
| Na/HMPA | HMPA | ~0 | <0.8 |
| "RIEKE" TI* | TOLUENE | ~0 | 2.0 |
| "RIEKE" TI* | THF | TRACE | <1.0 |

The first through third entries are telling. The Na/toluene and Na/DME (glyme) results are typical of reactions run under heterogeneous conditions. When a soluble Na/biphenyl reductant is used, however, no polymer is formed at all, only cyclics (cf. a 28% yield of 9,000 molecular weight polymer formed with insoluble Na metal as reductant). This suggests strongly that the polymer-forming pathway is intimately linked to the heterogeneity of the reaction and that polymer is formed preferentially or solely at the Na surface. Partially, as a result of this observation, the yield and molecular weight of polymer formed has been shown to be strongly dependent on the mode and rate of reagent addition and the degree of constancy of the addition rate. Surprisingly, the absolute addition rate was found (Table 6) to have little effect on the yield or molecular weight of (PhMeSi)$_n$ in either the inverse or normal addition modes.

TABLE 6

INVERSE vs NORMAL ADDITION IN (PhMeSi)$_3$ SYNTHESIS

| ADDITION RATE (MEQ/MIN) | INVERSE ADDITION MODAL MW ($\times 10^{-3}$) | NORMAL ADDITION MODAL MW ($\times 10^{-3}$) |
|---|---|---|
| 80 | 600 | |
| 160 | 2000 | 3.4 |
| 320 | 600 | |
| 640 | 2000, 210 | 4.0 |

Figure 1:
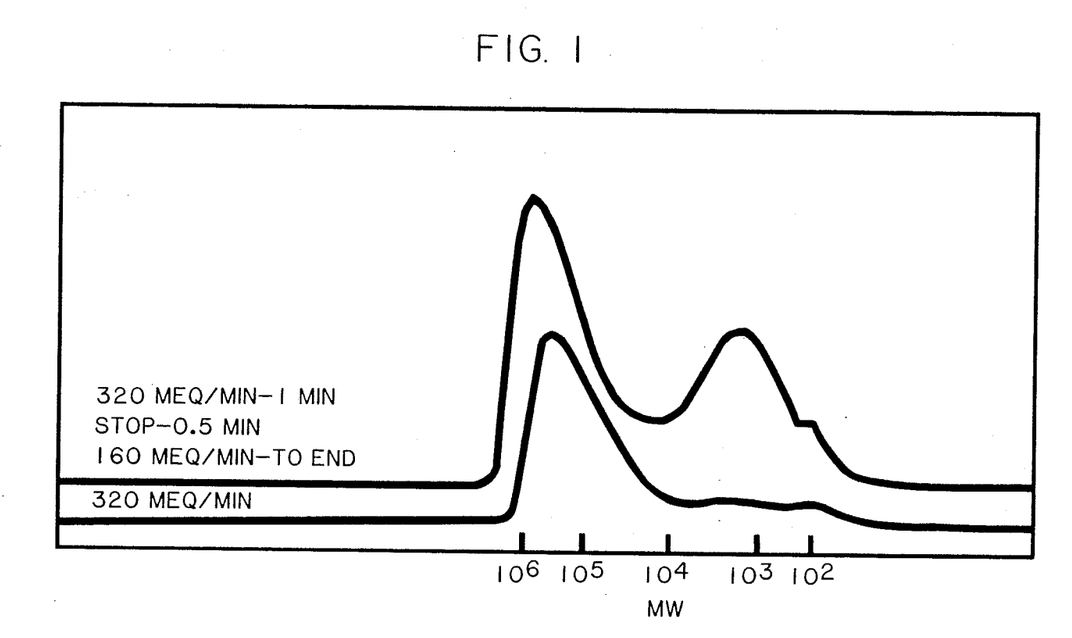
FIGS. 1-4 show various effects of varying conditions on the nature of polysilane produced upon polymerizing the corresponding dichlorosilane.

Moreover, for these absolutely constant addition rates (syringe pump addition), a monomodal molecular weight distribution for the linear polymer fraction was obtained (FIG. 1). When the addition rate was allowed to vary in a well-defined manner, the molecular weight distribution became strongly bimodal (FIG. 1). These are the first experiments in which the necessity for constancy of addition rate has been identified as a major factor in obtaining low polydispersity in the polymer fraction.

Figure 2:
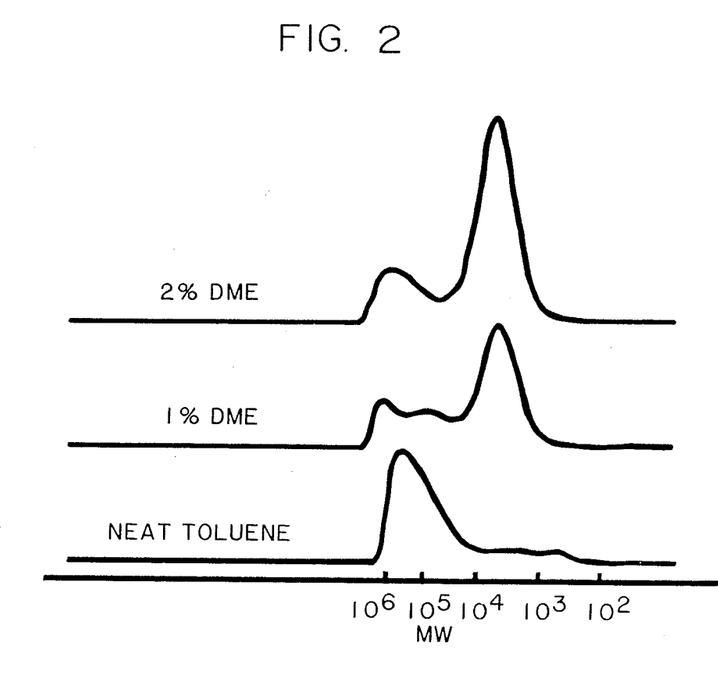

Previous workers (e.g., Miller, Schilling, etc.) have disclosed that addition of ether cosolvents to the extent of 15% or more increases the yield of polymer, although it lowers the molecular weight and increases polydispersity. As shown in FIG. 2, it has now been discovered that addition of 2% or less by volume of DME (dimethoxyethane) to the toluene reaction solvent provides similar yield improvement but does not reduce the yield or molecular weight of high polymer; a new mode at lower MW simply grows in and this accounts for most of the yield increase. Since the high polymer mode does not broaden and shift to lower MW with DME addition, it has been shown that this is a bulk solvent effect rather than a result of chain transfer to solvent.

Figure 3:
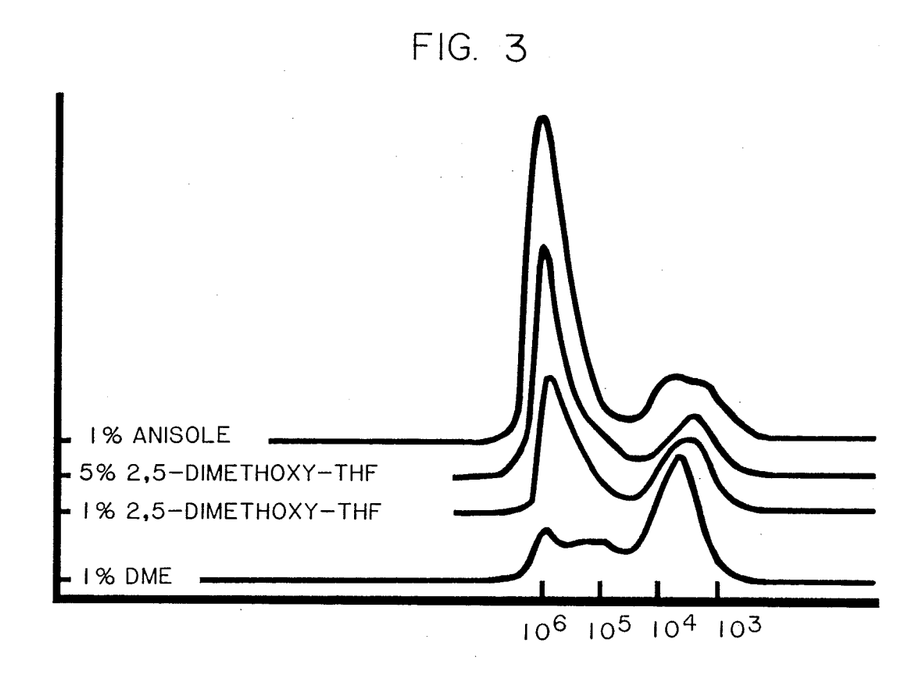

This view is supported by the results in FIG. 3, which show that addition of cosolvents with much better chain transfer capabilities than DME (anisole and 2,5-dimethoxytetrahydrofuran) also leave the high molecular weight mode unaffected but increase the new low molecular weight mode to a lesser extent. Since ether solvents are expensive, difficult to purify and dangerous to store long-term, the discovery per se that much smaller amounts of particular ether solvents than indicated in the prior art are effective in increasing yield but do not reduce the molecular weight of the high polymer weight mode is a significant improvement over the prior art, where much larger quantities of cosolvent are used and the molecular weight is significantly lowered.

EXAMPLE 2

Decreasing the compatibility (as measured by relative solubility parameters) between the polymer and the reaction solvent, forces more of the reaction to occur on the Na surface. Alternatively, increasing the effective surface monomer concentration in polymerization using normal additions should accomplish the same goal. As shown in Table 7, both approaches are effective.

TABLE 7

TESTS OF SURFACE REACTION HYPOTHESIS

| | YIELD(%) | MODAL MW($\times 10^{-3}$) |
|---|---|---|
| "STANDARD CONDITIONS" | | |
| TOLUENE, INV. ADD., 320 MEQ/MIN, PhMeSiCl$_2$ | 10 | 600 |
| SAME, NORM. ADD. | 23 | 4 |
| ADD MONOMER SOLUTION TO 1:1 TOLUENE/Na DISPERSION | | |
| 4% PhMeSiCl$_2$ IN TOLUENE | 30 | 35 |
| 30% PhMeSiCl$_2$ IN TOLUENE | 41 | 20 |
| MAXIMIZE SOLUBILITY PARAMETER MISMATCH | | |

| SOLVENT | $\delta_s-\delta_p$ | YIELD(%) | MODAL MW ($\times 10^{-3}$) |
|---|---|---|---|
| 9:1 TETRALIN/TOLUENE | +1.1 | 30 | 110 |
| 1:1 TOLUENE/DECANE | −0.7 | 37 | >1000, 50 |

Increasing the surface monomer concentration by adding a 30% solution of PhMeSiCl$_2$ in toluene to a 1:1 mixture of Na dispersion and toluene increases the yield by a factor of almost 2 and the molecular weight by a factor of 5 relative to the prior art method of adding neat monomer to a dilute toluene slurry of Na dispersion. By decreasing the polymer/solvent compatibility, the high molecular weights characteristic of inverse addition are preserved but the yield is increased by approximately a factor of three for tetralin or decane cosolvents relative to reactions run in pure toluene.

EXAMPLE 3

Figure 4:
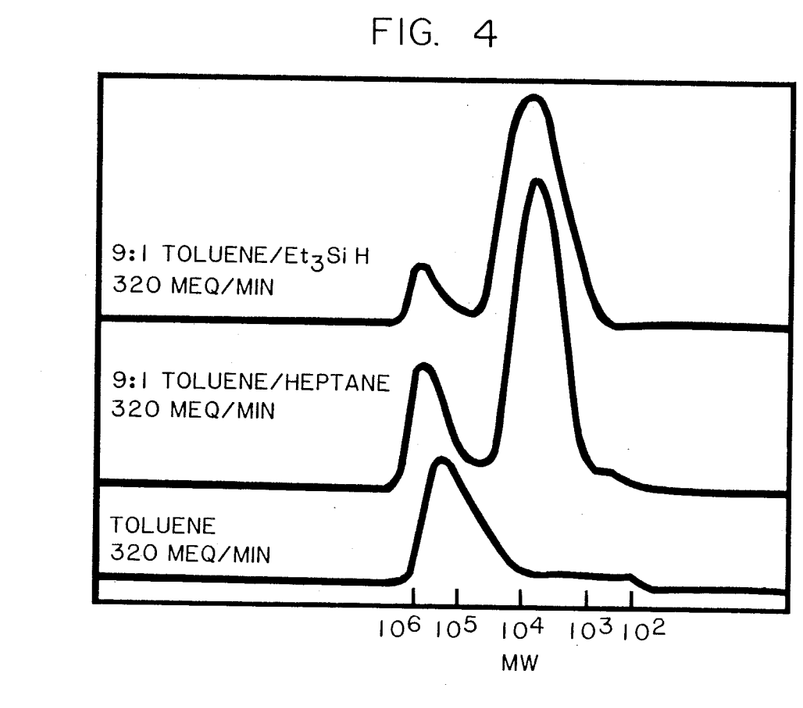

Although tetralin or decane are considerably easier to handle than the ether solvents, they are still somewhat expensive. However, as shown in FIG. 4, the effects of the expensive solvents previously discussed can be effectively mimicked by use of heptane, a cheap solvent which is one of the major components in gasoline. The polydispersity of the high molecular weight mode of materials prepared in 9:1 toluene/heptane is considerably less than that of material prepared in pure toluene. This reduction in polydispersity, in addition to the increased yields, is a major advantage of this solvent modification.

Referring back to FIG. 4, addition of the highly efficient silylene trapping agent, Et$_3$SiH, has essentially the same effect on yield and molecular weight distribution as the chemically inert additive, heptane. This and other evidence suggest that silylene intermediates, if formed at all in these reactions, are not on the pathway to high polymer. Similarly, it has been suggested that silyl anions might be crucial intermediates in polymer formation, based on the fact that addition of diglyme, and other ether solvents, increases the yield of polymer, due to its ability to stabilize silyl anions by complexation of the Na counterion. However, the fact that the same yield improvements and similar molecular weight distributions are achieved by addition of heptane, a solvent that should strongly destabilize such anions, suggests, again, that silyl anions are not important intermediates on the path to high polymer. Thus, it appears that silyl radicals are the crucia intermediates.

EXAMPLE 4

In FIG. 5 are plotted the yield and Mw of (PhMeSi)$_n$ obtained in various mixed toluene/heptane reaction solvents for reactions run in inverse mode. The optimum solvent composition in this series is about 65/35 toluene/heptane, providing a solubility parameter difference $s_{s-p}$ of about 0.65.

EXAMPLE 5

As discussed above, addition of a solution of PhMeSiCl$_2$ in toluene to a 1:1 (v:v) toluene/Na dispersion mixture improves the yield from 23 to 41% and also increases modal MW from 4,000 to 20,000. When this procedural modification is combined with a 90/10 toluene/heptane solvent modification, a 60% yield of (PhMeSi)$_n$ with modal molecular wight of 100,000 and Mw=42,000 (cf 41% of modal molecular weight 20,000 with the improved addition procedure alone and 45% of (PhMeSi)$_n$ of Mw=130,000 with the improved solvent mixture alone) is obtained. Thus, a revised procedure incorporating three of the improvements of this invention allows for the first time, the synthesis of high molecular weight (PhMeSi)$_n$ in high yield without crosslinking.

EXAMPLE 6

The use of an improved reaction solvent mixture has been tested for other polysilanes. The results of these tests are summarized in Table 8 and show that similar striking improvements are achieved with other monomers.

TABLE 8

Synthesis of Various Polysilanes in 9:1 toluene/heptane

| | Yield (%) | | $\overline{M}w$ ($\times 10^{-3}$) | |
|---|---|---|---|---|
| Polymer | This Invention | Prior Art | This Invention | Prior Art |
| (PhMeSi)$_n$ | 45 | 15 | 130000 | 280000 |
| (di-n-hexyl)$_n$ | 6.7 | 2.7 | >600000 | >600000 |
| (cyclohexyl MeSi)$_n$ | 7.1 | 2.8 | 162000 | 95000 |

"Prior art" results are the best results of this work for polymers made in pure toluene as solvent by the inverse addition technique without control of the addition rate. The results for this invention were obtained with the standard inverse addition procedure using 9:1 toluene/heptane as solvent. As can be seen, significant improvements in yield and/or molecular weight are achieved in all cases using the modified solvent of this invention.

EXAMPLE 7

Effect of stearic acid addition on PhMeSiCl$_2$ polymerization

TABLE 9

| Stearic Acid Amt (mg) | Addition mode | Yield (%)* | $\overline{M}_w$ ($\times 10^{-3}$) |
|---|---|---|---|
| 0 | N | 20 | 4 |
| 1 | N | 10 | 38 |
| 10 | N | 8.3 | 19 |
| 100 | N | 6.8 | 40 |
| 0 | I | 17.5 | 298 |
| 100 | I | 6.4 | 200 |

Conditions: Solvent - 100 ml toluene; 5 g PhMeSiCl$_2$; 2.2 eq Na dispersion; 320 meq/min. Na addition rate
*Some yields were affected by impure sodium samples.

EXAMPLE 8

In Table 10 are shown results of a comparison of yield and MW obtained in a calculated optimum solvent (solubility parameter difference=0.65) vs. those obtained in pure toluene. All reactions were carried out at a monomer concentration of 0.26M. The Na addition rate was 320 meq/min and the Na was dispersed in mineral spirits (40% w/v).

TABLE 10

| Polymer | Solvent (toluene/heptane) | Yield (%) | $\overline{M}_w$ ($\times 10^{-3}$) |
|---|---|---|---|
| (n-PrMeSi)$_n$ | 100/0 | 32 | 134 |
|  | 58/42 | 38 | 198 |
| (di-n-hexylSi)$_n$ | 100/0 | 4 | 2485 |
|  | 70/30 | 2 | 3185 |
| (PhMeSi)$_n$ | 100/0 | 21 | 1243 |
|  | 60/40 | 21 | 1562 |
| (CyclohexylMeSi)$_n$ | 100/0 | 3 | 227 |
|  | 77/23 | 8 | 829 |

Substantial improvements in $\overline{M}_w$ are achieved in the calculated solvents. Yields are also generically improved although solvent effects on chain stitching processes may cause slight decreases in yield in some cases (e.q. (di-n-hexylSi)$_n$ above).

EXAMPLE 9

Na amalgam can also be used to prepare polysilanes. In Table 11 are results for preparation of polysilanes in non-optimum solvents using Na amalgam (1:1). Reaction conditions were the same as in Example 8.

TABLE 11

| Polymer | Solvent | Yield (%) | $\overline{M}_w$ ($\times 10^{-3}$) |
|---|---|---|---|
| (PhMeSi)$_n$ | Benzene | 9.5 | 164 |
| β-phenethylMeSi)$_n$ | Benzene | 13.6 | 51 |

ADDITIONAL IMPROVEMENTS

In order to optimize the application of the foregoing principles to carrying out the methods of this invention, it is highly preferred that the surface of the solid surface reacting agent used, e.g., in the heterogeneous reductive condensations, be as clean and impurity- and contaminant-free as possible. Essentially, anything which is in contact with the solid surface can impact the methods of this application, especially when applied to the preparation of poly(silylsilanes) referred to below. However, the same principles also apply to the preparation of the polysilanes discussed above, as well as to other polysilane-containing polymers, e.g., such as the interrupted polysilanes referred to below.

Typical "contaminants" found to materially affect the performance of the methods include oxidation products and other foreign material, the surface active agents typically included in commercial dispersions of sodium and other solid agents (e.g., stearates such as aluminum stearate), etc. For this reason, it is highly preferred to employ commercial sodium dispersions having as low an amount of surface active agent as possible and which have been prepared as recently as possible. The use of such fresh dispersions minimizes the likelihood of surface contamination by the usual oxidation products. The latter include the common, slightly yellowish or brownish to highly yellowish or brownish (depending on the degree of oxidation) products sometimes formed by reactions of peroxides formed on the surface of sodium or other surface reacting agents.

The most preferred variant for applying the principles discussed above to the methods of this invention is the employment of a sodium dispersion which is essentially free from surface active agents as well as other impurities. In this way, the cleanest possible surface will be used as the starting point. Thus, for example, where good yields of a desired molecular weight and/or poly dispersity are facilitated by unfettered sodium surfaces, the possibility will be provided of utilizing an essentially totally clean surface by simply maintaining the starting form of the solid agent. Where the desired molecular weight and/or polydispersity is not adversely affected or is even enhanced by the presence of certain molecular species at the surface, and where these species are adventitious surface "contaminants" in a given reaction medium, e.g. surfactants from a sodium dispersion, avoidance or elimination of such "contaminants" from the surface will be less important. In this regard, reference is made to example 7 above, which demonstrates the effect of a surface active agent on the methods of this invention where commercially available sodium dispersions are employed as the solid surface reacting agent. The latter data demonstrate how the presence of a surface active agent in commercial formulations of sodium can have adverse effects where the desired mode is to provide good access to the sodium surface. Of course, these data also demonstrate how the inherent presence of the surface active agent in the commercial formulations can beneficially affect performance under the appropriate circumstances, e.g., where it is desired to prepare lower molecular weights using inverse addition.

The data of Table 12 report further investigations into the effect of variations in commercially available dispersions of sodium. Just as in Example 7, significant variations in molecular weights and yields occur. For the light oil dispersant which is ostensibly free of surface active agent, evidence was found which establishes that surface active agents are in actuality present in these commercial formulations. This is not only evidenced by the molecular weight effects from lot to lot, but also by the presence of product impurities traceable to surface active agents. The mineral spirits and toluene dispersants both contain aluminum stearate as the conventional surface active agent.

The light oil data and especially the mineral spirits data also show the effect of aging on results. The four mineral spirits experiments were performed sequentially over a period of one week from top to bottom. Except for the passage of time, all conditions were the same. These data show that aging does play a significant role, most likely due to the increasing concentration of oxidation products over time. Mineral oil dispersions showed results similar to those shown in Table 12.

Based on the foregoing, the preferred manner of carrying out this invention is to begin with a solid surface reacting agent in the form of a freshly prepared dispersion which is essentially free of surface active agents and other contaminants or at least as free of these as possible. Most preferably, this dispersion will be freshly prepared just prior to use using fully conventional methods both for surfactant-free and surfactant-containing mixtures. However, where this is not possible, e.g., due to lack of the appropriate equipment, commercially available dispersions can successfully be employed. In this case, it is preferred that preliminary, routine orientation experiments be carried out prior to the full polymerization run in order to verify that the particular commercial lot has the appropriate characteristics to achieve the desired molecular weights and/or polydispersities. Such tests are very simple and not time consuming. Since the commercial formulations do include surface active agents (as mentioned above, this also pertains to the light oil formulations), such preliminary experiments will be most important wherever such formulations are utilized. Because of the large variations noted from lot to lot in the light oil dispersants, it is presently preferred to employ the commercially available mineral spirits Na-dispersions containing surface active agents such as aluminum stearate in conjunction with the mentioned routine preliminary orientation experiments. Of course, the commercially available formulations containing the lowest amounts of surface active agent should be employed where available.

Where it is possible to employ sodium dispersions essentially free of surface active agents and other impurities, there are no significant changes in the polymerization methods of this invention or in the way the sodium is handled. The role of the surface active agent is primarily to minimize agglomeration and to stabilize the dispersions. Thus, it may be necessary to include in any consideration of suitable conditions for a given polymerization run the possibility that a surfactant-free dispersion may tend to have particles which are on the whole larger than those typically found in commercial surfactant-containing formulations.

Acceptable levels of surfactants and/or other contaminants for any given set of conditions from among those described above can be routinely determined in conjunction with a few preliminary orientation experiments. See, for example, the foregoing discussion regarding the use of surfactants to achieve desired control. In general, as noted above, it will be desired to minimize as greatly as possible the degree of contaminants and impurities. This also applies to surfactants since it is best to begin with a surfactant-free formulation and, where desirable, controllably add to the formulation an appropriate amount of surfactant in accordance with the foregoing discussion. Alternatively, of course, where a given lot already contains a certain amount of surface active agent, and where that amount is appropriate for achieving a desired molecular weight in accordance with the foregoing discussion, that particular lot will be suitable in accordance with this invention.

The methods of this invention and the entirety of this application are applicable, not only to the preparation of the polysilanes discussed above, but also to the preparation of other polymers prepared by heterogeneous reductive condensations where reactions are carried out on solid surface reacting agents such as sodium. These especially include the interrupted polysilanes of U.S. Ser. No. 910,672, filed September 23, 1986 and the poly(silylsilanes) of U.S. application Ser. No. 925,552, filed Oct. 31, 1986. The entirety of the disclosures of these two applications are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE 12

VARIATION OF YIELD AND $\overline{M}_w$ FOR $(PhMeSi)_n$ WITH Na DISPERSION* USED

| DISPERSANT | LOT | YIELD (%) | $\overline{M}_w (\times 10^{-3})$ |
|---|---|---|---|
| LIGHT OIL | A (BOTTLE 1) | 55 | 152 |
| LIGHT OIL | A (BOTTLE 2) | 18 | 284 |
| LIGHT OIL | A (BOTTLE 1-OLD) | 18 | 415 |
| LIGHT OIL | B | 60 | 62 |
| MIN. SPIRITS | C | 23 | 1260 |
| MIN. SPIRITS | C | 27 | 707 |
| MIN. SPIRITS | C | 24 | 564 |
| MIN. SPIRITS | C | 23 | 219 |
| TOLUENE | D | 22 | 1934 |

CONDITIONS: 320 MEQ/MIN Na ADD. RATE, [MONOMER]$_0$ = 0.26 M, 100 ML TOLUENE SOLVENT
*All lots were manufactured by Matheson Gas Products and contained 40% Na.

What is claimed is:

1. A method of controlling the yield of polysilane of a desired molecular weight and/or polydispersity prepared in a reductive condensation polymerization of the corresponding silane monomers on a solid surface-reacting agent which is effective to polymerize said monomers and is dispersed in an inert solvent for both the monomers and the growing polymer chains,
   comprising determining the functional dependence of molecular weight and/or polydispersity of said polysilane as a function of the compatibility of said polysilane with reaction solvent, determining therefrom an optimum degree of the compatibility of said polysilane in reaction solvent which optimizes the yield of polysilane of said desired molecular weight and/or polydispersity, and thereafter preparing said polysilane by carrying out the reductive condensation polymerization in a particular reaction solvent in which said polysilane has said chosen optimum degree of compatibility.

2. A method of claim 1, wherein said solid surface-reacting agent is sodium.

3. A method of claim 2, wherein the sodium is added to a solution of said monomers in said particular solvent.

4. A method of claim 3, for substantially increasing yield of polysilane of higher molecular weight and/or decreased polydispersity, wherein the solvent is chosen to minimize the compatibility of the growing polymer chains with the solvent without effecting precipitation of said polymer chains.

5. A method of claim 4, wherein said compatibility is such that the solubility parameter of the solvent used minus the solubility parameter of the polysilane polymer prepared is a solubility parameter difference of about 0.6 to 0.7.

6. A method of claim 5, wherein said polysilane is a homopolymer.

7. A method of claim 5, wherein said polysilane is a copolymer.

8. A method of claim 5, wherein the solvent is a mixture of individual solvents and said solubility parameter difference is achieved by correspondingly adjusting the relative amounts of the individual solvents in the mixture.

9. A method of claim 8, wherein the individual inert solvents contained in said mixture are hydrocarbon arenes, alkanes or hydrocarbon ethers with no active hydrogen atoms.

10. A method of claim 8, wherein the solvent is a mixture of toluene and heptane.

11. A method of claim 2, wherein the monomers are added to a dispersion of sodium in the solvent.

12. A method of claim 11, wherein said particular solvent is chosen to maximize the compatibility of said polysilane with the solvent.

13. A method of claim 12, wherein the difference between the solublity parameter of said particular solvent used and that of said polysilane prepared is substantially zero.

14. A method of claim 13, wherein said polysilane is a homopolymer.

15. A method of claim 13, wherein said polysilane is a copolymer.

16. A method of claim 13, wherein the solvent is a mixture of individual solvents and said solubility parameter difference is achieved by correspondingly adjusting the relative amounts of the individual solvents in the mixture.

17. A method of claim 16, wherein the individual inert solvents contained in said mixture are hydrocarbon arenes, alkanes or hydrocarbon ethers with no active hydrogen atoms.

18. A method of claim 16, wherein the solvent is a mixture of toluene and heptane.

19. A method of claim 4, wherein the addition of the sodium is at a substantially constant rate, whereby the polydispersity of the resultant polysilane is decreased with respect to the polydispersity obtained when said rate is not substantially constant.

20. A method of claim 12, wherein the addition of the monomers is at a substantially constant rate, whereby the polydispersity of the resultant polysilane is decreased with respect to the polydispersity obtained when said rate is not substantially constant.

21. A method of preparing a polysilane comprising reductive condensation polymerizing the corresponding silane monomers by adding a solid surface-reacting agent, which is effective to polymerize said monomers, to a solution of said monomers in a reaction solvent which is a mixture of at least two individual reaction solvents, the relative amounts of which substantially minimize the compatibility of said polysilane therewith without causing said polysilane to precipitate.

22. A method of preparing a polysilane comprising reductive condensation polymerizing the corresponding silane monomers by adding said monomers to a dispersion of sodium in a reaction solvent which is a mixture of at least two individual solvents, the relative amounts of which substantially maximize the compatibility of said polysilane therewith.

23. A method of preparing a polysilane comprising the single step of reductive condensation polymerizing the corresponding silane monomers on a solid surface-reacting agent, which is effective to polymerize said monomers, in an inert solvent which was previously selected by a method comprising determining the functional dependence of molecular weight and/or polydispersity of said polysilane as a function of the compatibility of said polysilane with reaction solvent, determining therefrom an optimum degree of the compatibility of said polysilane in reaction solvent which optimizes the yield of polysilane of a desired molecular weight and/or polydispersity, and selecting a particular reaction solvent in which said polysilane has said chosen optimum degree of compatibility.

24. A method of controlling the molecular weight and/or polydispersity of a polysilane prepared in a reductive condensation polymerization of the corresponding silane monomers on a solid surface-reacting agent which is effective to polymerize said monomers and is dispersed in an inert reaction solvent, comprising incorporating in the reaction medium an effective amount of a surfactant having a polar end which can bond to said solid agent.

25. A method of claim 24, wherein the amount of surfactant is 0.1 to 500 mg/l of reaction solvent.

26. A method of claim 24, wherein the monomers are added to the solid agent, and the amount of said surfactant is 10–100 mg/l of reaction solvent.

27. In a method of preparing a polysilane by reductive condensation polymerization of the corresponding silane monomers on sodium, the improvement wherein the sodium is used in the form of sodium amalgam having a Na/Hg mole ratio of 5/1 to 1/5.

28. A method of claim 1 wherein the surface of said solid surface-reacting agent is essentially free of chemically bonded or adsorbed contaminants.

29. A method of claim 1 wherein said dispersion of solid surface-reacting agent is essentially surfactant-free.

30. A method of claim 21 wherein the surface of said solid surface-reacting agent is essentially free of chemically bonded or adsorbed contaminants and said polymer is a poly(silylsilane) homo or copolymer.

31. A method of claim 21 wherein said dispersion of solid surface-reacting agent is essentially surfactant-free and said polymer is a poly(silylsilane) homo or copolymer.

32. A method of claim 22 wherein the surface of said solid surface-reacting agent is essentially free of chemically bonded or adsorbed contaminants and said polymer is a poly(silylsilane) homo or copolymer.

33. A method of claim 22 wherein said dispersion of solid surface-reacting agent is essentially surfactant-free and said polymer is a poly(silylsilane) homo or copolymer.

* * * * *